United States Patent [19]
Akatsu et al.

[11] 3,886,787

[45] June 3, 1975

[54] METHOD OF AND APPARATUS FOR MEASURING PHYSICAL QUANTITIES OF A ROTATING BODY

[75] Inventors: Toshio Akatsu, Tokyo; Toshimitsu Fujiyoshi, Kashiwa, both of Japan

[73] Assignee: Hitachi, Ltd., Japan

[22] Filed: Oct. 30, 1973

[21] Appl. No.: 411,176

[30] Foreign Application Priority Data
Nov. 2, 1972 Japan.............................. 47-109409

[52] U.S. Cl.............................. 73/88.5 R; 73/351
[51] Int. Cl. .............................................. G01b 7/18
[58] Field of Search......... 73/88.5 R, 351, 340, 341, 73/342; 340/183, 150, 147 CN

[56] References Cited
UNITED STATES PATENTS
2,800,790  7/1957  Schover ......................... 73/88.5 R
3,098,214  7/1963  Windes et al. ............... 340/147 CN
3,335,228  8/1967  Thompson et al. ............. 340/183 X
3,357,006  12/1967  Wisniefski........................ 340/183

FOREIGN PATENTS OR APPLICATIONS
244,687  5/1969  U.S.S.R........................ 73/88.5 R

*Primary Examiner*—Charles A. Ruehl
*Attorney, Agent, or Firm*—Craig & Antonelli

[57] ABSTRACT

In a method of and apparatus for measuring such physical quantities of a rotating body as mechanical stresses, strains, etc., by strain gages attached to many measuring points in the rotating body, switching elements incorporated in the rotating body are changed over by signals from outside or inside the rotating body and the output of the strain gages are sequentially taken out of the rotating body in response to the change-over operation of the switching elements.

10 Claims, 5 Drawing Figures

3,886,787

METHOD OF AND APPARATUS FOR MEASURING PHYSICAL QUANTITIES OF A ROTATING BODY

BACKGROUND OF THE INVENTION

1. Field of the Invention

This invention relates to a method of and apparatus for measuring with high accuracy physical quantities of a rotating body at many points of the body.

2. Description of the Prior Art

In the conventional method of measuring mechanical strains in a rotating body, as described later in detail in comparison with this invention, a bridge including a strain gage is attached to every measuring point where a quantity to be measured is derived, the bridge being provided with four pairs of slip rings and brushes through which power is fed to the bridge, and an output is derived from the bridge.

The same structure and circuit arrangement can be employed in the case where pressure in a rotating body is measured by a pressure transducer of the strain gage type.

According to these conventional methods, however, there are such drawbacks as follows. Since four pairs of slip rings and brushes are needed for every measuring point, the number of the measuring points is limited. In addition, the output derived from the bridge and having a small level is subject to the influence of noise generated between the slip rings and the brushes so that there is a need for maintenance to always minimize the contact resistance between them. Accordingly, the peripheral speed of the slip rings, i.e., the rotational speed of the rotating body, must be limited.

Moreover, in the case where the temperature of a rotating body is measured by a thermocouple, one thermocouple is needed for every measuring point while two pairs of slip rings and brushes are to be used to take the output of the thermocouple out to an amplifier, which amplifies the output up to a level suitable for measurement. Also, in this case, however, two pairs of slip rings and brushes are needed for a measuring point so that the number of measuring points is limited. Further, in this case, the thermo-electromotive forces generated between the slip rings and the brushes give rise to an error in measurement so that it is necessary to select the materials for the slip rings and the brushes in such a manner that such thermo-electromotive forces are minimized.

SUMMARY OF THE INVENTION

The main object of this invention is to provide a method of and apparatus for measuring physical quantities in a rotating body, which can effect measurements at many points on the body by using a minimum number of slip rings and brushes or without using any of them and which has an improved measurement accuracy.

According to this invention which has been made to attain the above object, there is provided a method of and apparatus for measuring physical quantities in a rotating body, in which physical quantities such as mechanical stresses or strains at many points on or in the rotating body are converted to corresponding electrical signals by means of strain gages and the like and in which the electrical signals are taken out through switching them over in response to a signal derived from inside or outside the rotating body.

Other objects, features and advantages of this invention will be apparent from the following description of this specification wherein the preferred embodiment of this invention is described in conjunction with the attached drawings.

BRIEF DESCRIPTION OF THE DRAWING

Throughout the drawings, the same reference numerals and characters are applied to like parts or elements.

DESCRIPTION OF THE PREFERRED EMBODIMENT

Figure 1:
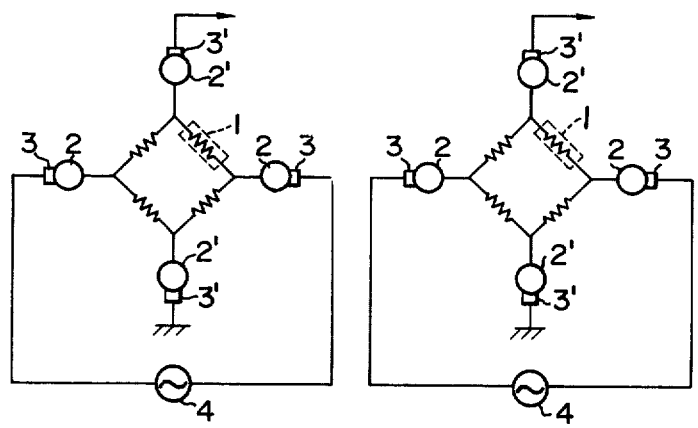
FIG. 1 is an electrical circuit for carrying out a conventional method of measuring physical quantities in a rotating body at several measuring points in or on the body.

A conventional method will first be described for better understanding of this invention. In FIG. 1, which is an electrical circuit for carrying out a conventional method of measuring with strain gages such physical quantities as mechanical strains at many points in or on a rotating body, two bridges each having a strain gage 1 are disposed at two measuring points. Each bridge is connected through two slip rings 2 and two brushes 3 with external power source 4, while the outputs of the respective bridges are taken out through two slip rings 2' and two brushes 3' so as to be amplified and measured. As described above, in the conventional method, four pairs of slip rings and brushes are needed for every measuring point so that the number of the measuring points is limited. Moreover, since the small output voltage of each bridge is directly taken out, each output voltage is adversely affected by the noise generated through the sliding contact between the slip rings and the brushes. Therefore, careful maintenance is necessary to keep a good contact between the slip rings and brushes, and also the limited. speed of the rotating body is limitied.

Now, the embodiment of this invention will be described in which such physical quantities as mechanical strain and stress at many points in a rotating body are measured by strain gages and the result of the measurement is sequentially taken out through switching-over in response to light signals from outside the rotating body.

Figure 2:
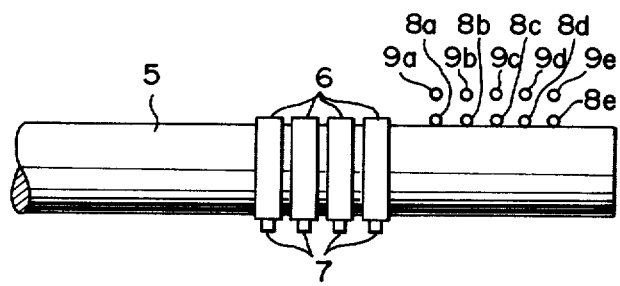
FIG. 2 shows an arrangement of members used to transmit and receive light signals, which members are used in a device for carrying out a method according to this invention.
Figure 3:
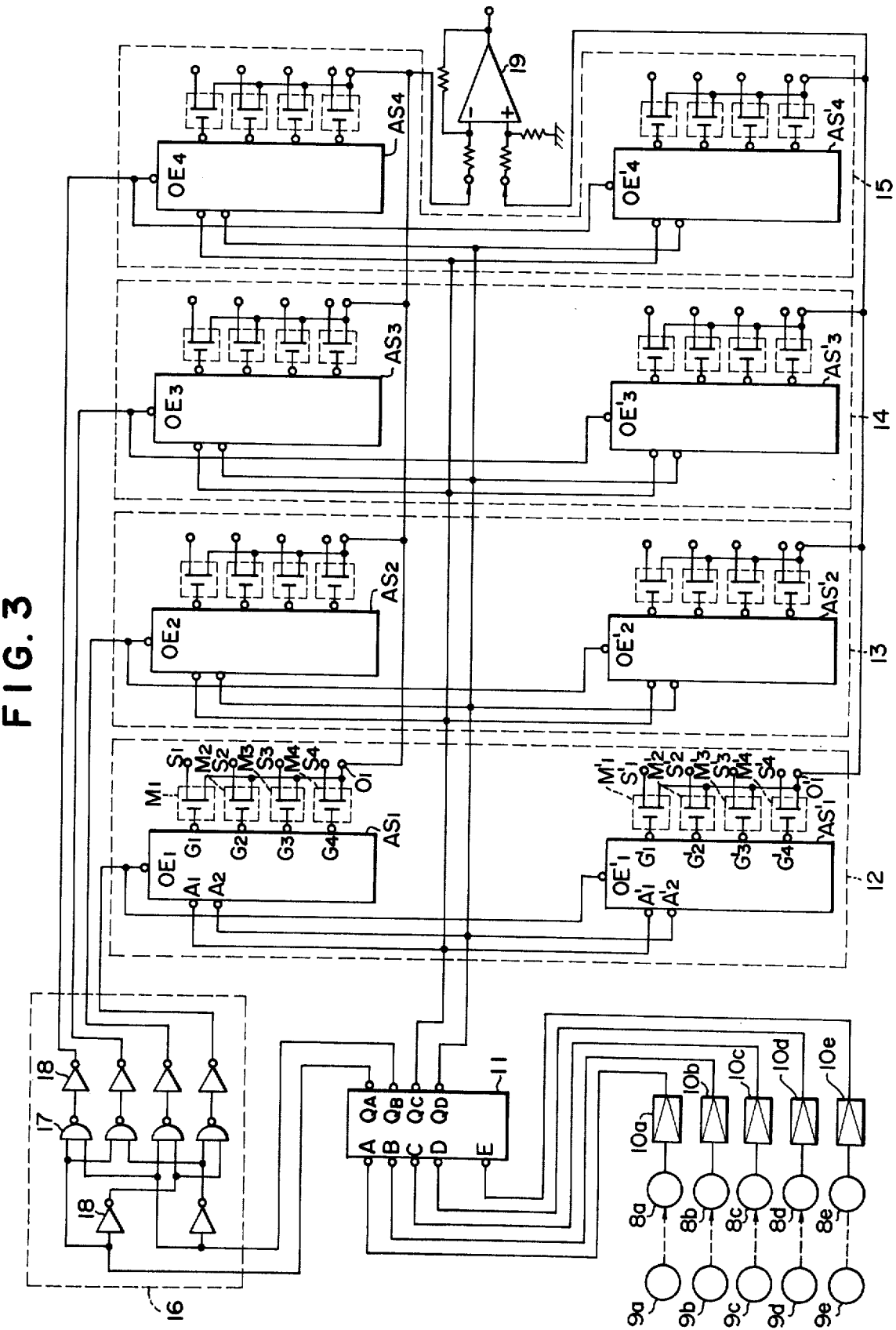
FIG. 3 is an electrical circuit of a switching device which is operated by the light signals received by the structure shown in FIG. 2.

Reference should be had to FIGS. 2 and 3, in which the shaft 5 of a rotating body has four slip rings 6 and four brushes 7 are disposed in sliding contact with the slip rings 6. The rotating shaft 5 has, for example, five light receiving devices 8a, 8b, 8c, 8d and 8e fixed thereon and five light projectors 9a, 9b, 9c, 9d and 9e are disposed on a stationary part (not shown), corresponding to the light receivers. Photo-amplifiers 10a, 10b, 10c, 10d and 10e are connected respectively with the light receivers 8a, 8b, 8c, 8d and 8e, and when the light projectors $9a$ to $9e$ are energized during the rotation of the shaft 5, the light receivers $8a$ to $8e$ are exposed for a short time during each revolution of the shaft 5, to the light from the projectors so that the outputs of the photo-amplifiers $10a$ to $10e$ rise from a low level to a high level only for the short period.

The position of the receiver $8e$ or the projector $9e$ is appropriately adjusted, that is, staggered from the other receivers or projectors, so that the change in the output of the photo-amplifier $10e$ from low to high level may occur slightly later than those in the outputs of the other photo-amplifiers $10a$ to $10d$ from low to high levels.

The output of the photo-amplifier $10e$ is used as a clock signal for a flip-flop circuit 11 forming the next stage.

The flip-flop 11 serves to transfer the logical signals applied to its terminals A to D, to the terminals $Q_A$ to $Q_D$ in response to the clock signal applied to the terminal E.

An analog switch 12 consists of 4-channel analog switching elements $AS_1$ and $AS_1'$ with the terminals $A_1$ and $A_1'$ and the terminals $A_2$ and $A_2'$ connected respectively with the terminals $Q_C$ and $Q_D$ of the flip-flop 11 to receive a logical signal having two bits.

According to the four kinds of contents of the logical signal, therefore, a gating signal is delivered to one of the gate terminals $G_1$ to $G_4$ ($G_1'$ to $G_4'$) so that one of the gating elements $M_1$ to $M_4$ ($M_1'$ to $M_4'$) connected with the energized terminal is rendered conductive.

Analog switches 13 to 15 have the same constitution as the analog switch 12 and are all connected in parallel to the analog switch 12. A gating circuit 16, consisting of NAND gates 17 and inverters 18, is connected with the terminals $Q_A$ and $Q_B$ of the flip-flop 11 and has four output terminals connected with the terminals $OE_1$ to $OE_4$ and $OE_1'$ to $OE_4'$ of the elements $AS_1$ to $AS_4$ and $AS_1'$ to $AS_4'$ of the analog switches 12 to 15.

Therefore, according to the four combinations of the high and low level signals respectively at the terminals $Q_A$ and $Q_B$, there are four combinations of high and low level signals applied to the terminals $OE_1$ to $OE_4$ ($OE_1'$ to $OE_4'$) of the switching elements $AS_1$ to $AS_4$ ($AS_1'$ to $AS_4'$) of the analog switches 12 to 15. And those analog switches to which the high level signal is applied are driven into operation.

Figure 4:
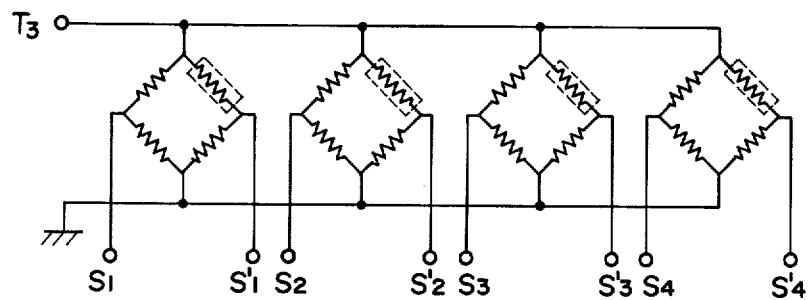
FIG. 4 shows an electrical connection of bridges used in a method according to this invention, each bridge circuit including a strain gage.

The switching terminals $S_1$ to $S_4$ and $S_1'$ to $S_4'$ of the elements $AS_1$ and $AS_1'$ of the analog switch 12 are connected respectively with the output terminals of the bridges, each containing a strain gage attached to one of several measuring points of the rotating body, as shown in FIG. 4.

In like manner, the switching terminals of each switching element of the analog switches 13 to 15 are also connected with the output terminals of the bridges, each including a strain gage attached to one of many measuring points of the rotating body.

The terminals $0_1$ and $0_1'$ of the elements $AS_1$ and $AS_1'$ form the output terminals of the analog switch 12.

A differential amplifier 19 has its input terminals connected with the parallel-connected output terminals of the analog switches 12 to 15.

The output of the differential amplifier 19 is taken out through a set of slip ring and a brush.

Figure 5:
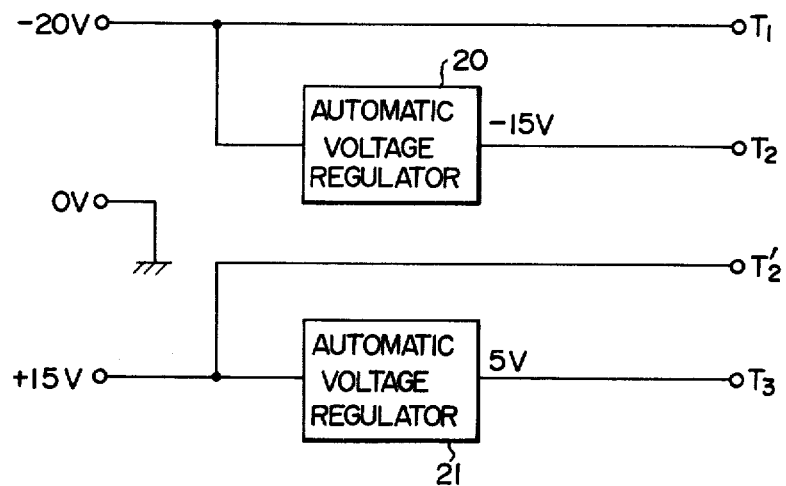
FIG. 5 is a block diagram of a power source used in the preferred embodiment of this invention.

FIG. 5 shows a power supply circuit consisting of a pair of automatic voltage regulators 20, 21. The power supply circuit is provided in the rotating body, and the voltages of $-20V$, $+15V$ and $0V$ are applied to their input terminals through three pairs of slip rings and brushes. A constant voltage of $-15V$ is produced from the source voltage of $-20V$ with the automatic voltage regulator 20, while a constant voltage of $+5V$ is produced from the source voltages of $+15V$ with the regulator 21. Two kinds of source voltage of $-20V$ and $+5V$ are required to operate the analog switch. Therefore, terminals $T_1$ and $T_3$ shown in FIG. 5 are connected with source terminals of the analog switch. Further, two kinds of source voltages of $+15V$ and $-15V$ are required to operate the differential amplifier. Terminals $T_2$ and $T_2'$ shown in FIG. 5, therefore, are connected with source terminals of the differential amplifier. In addition, a source voltage of $+5V$ is required to operate the circuits such as the photo-amplifier, flip-flop circuit, NAND gate circuit, inverter, and strain-gage bridge. Therefore, the terminal $T_3$ is also connected with each of source terminals of the above-mentioned circuits.

Next, the operation of the circuit shown in FIG. 3 will be described. Through the control of the energization and deenergization of the projectors $9a$ and $9b$, four combinations of high and low level signals at the output terminals $Q_A$ and $Q_B$ of the flip-flop 11 are obtained and a high level signal is applied to only one of the terminals $OE_1$ to $OE_4$ ($OE_1'$ to $OE_4'$) of the analog switches 12 to 15 through the function of the circuit 16.

When neither of the projectors $9a$ and $9b$ is deenergized, a high level signal is applied to the terminal $OE_1$ ($OE_1'$) of the analog switch 12. On the other hand, through the control of the energization and deenergization of the projectors $9c$ and $9d$ four combinations of high and low level signals are obtained at the output terminals $Q_C$ and $Q_D$ of the flip-flop 11 and according to the combinations one of the gating elements $M_1$ to $M_4$ ($M_1'$ to $M_4'$) connected with the gating terminals $G_1$ to $G_4$ ($G_1'$ to $G_4'$) of one operating analog switch is rendered conductive to cause the output of the bridge connected with the one of the switching terminals $S_1$ to $S_4$ ($S_1'$ to $S_4'$) which belongs to the conducting gating element to appear at the output terminal $0_1$ ($0_1'$).

In this way, the analog switches are sequentially changed over according to the combinations of energization and deenergization of the four projectors $9a$ to $9d$ (that is, 16 combinations) so that the physical quantities at the measuring points are converted to electrical signals, which are fed to differential amplifier 19 to be taken out of the rotating body through a set of a slip ring and a brush.

If the number of measuring points is increased, not only the number of projectors and receivers but also the number of analog switches and the channels of the switching elements of each analog switch must be increased so as to cover the increased combinations of energization and deenergization of the projectors.

In the embodiment described above, the circuits provided on the rotating body are powered through slip rings and brushes but it is also possible to incorporate a power source in the rotating body.

Moreover, in the above embodiment, the output of the differential amplifier is taken out of the rotating body through a slip ring and a brush, but is is also possible to provide in the rotating body a telemeter through which the measured quantities are taken out of the rotating body or to frequency-modulate the output of the differential amplifier so that the frequency-modulated signal may be converted to a light signal by means of, for example, a photodiode to be taken out.

Further, in the above embodiment, the analog switches are changed over by the light signals from outside the rotating body but they may also be changed over by electromagnetic or acoustic signals or directly by logical signals fed through slip rings and brushes. It is also possible to provide an oscillator and a counter in the rotating body to automatically change over the analog switches. In this case, however, it is necessary to take out of the rotating body the change-over signals as well as the signals representing the measured quantities.

As described above, according to this invention, the physical quantities at many measuring points of the rotating body are converted in the body to the corresponding electrical signals and the electrical signals are sequentially changed over in the rotating body in response to signals from outside or inside the rotating body so as to be taken out of the body, so that a plurality of measured quantities can be taken out of the body through a minimum number of slip rings and brushes or without any slip ring and brush.

Since the measured quantities are amplified in the rotating body and then taken out of the body, the influence by the noise generated due to the sliding contact between the brushes and the slip rings can be prevented.

Therefore, the present method and apparatus have the advantage that highly accurate measurements are possible over a wide range of rotational speeds of the rotating body, i.e., from low to high speeds, and that the maintenance of the slip rings and brushes is facilitated.

We claim:

1. A method of measuring physical quantities of a rotating body at many measuring points thereof, comprising
 a step of converting said physical quantities to corresponding electrical signals by measuring devices provided at said measuring points;
 a step of changing over switching circuits incorporated in said rotating body and connected with the output terminals of said measuring devices, in response to signals from outside or inside of said rotating body so as to sequentially deliver said electrical signals; and
 a step of taking said sequentially delivered electrical signals out of said rotating body,
 wherein said switching circuits are changed over by light signals from outside said rotating body.

2. A method as claimed in claim 1, wherein said measuring devices are strain gage bridges which convert mechanical strains at said measuring points of said rotating body to corresponding electrical signals.

3. A method of measuring physical quantities of a rotating body at a plurality of measuring points thereof, comprising the steps of
 converting said physical quantities into corresponding electrical signals within said rotating body;
 applying said electrical signals to input terminals of electronic switching elements provided within said rotating body;
 switching a desired number of said electronic switching elements in a desired order so as to deliver a corresponding number of the applied electrical signals in said desired order, each of said desired number of said electronic switching elements being switched in response to a signal from outside said rotating body; and
 taking the delivered electrical signals out of said rotating body, whereby the signals corresponding to said physical quantities are taken out of said rotating body in said desired order.

4. A method as defined in claim 3, wherein said signal from outside said rotating body is a light signal.

5. A method as defined in claim 3, wherein said signal from outside said rotating body is an acoustic signal.

6. A method as defined in claim 3, wherein said switching is performed by turning on and off a plurality of light emitting elements positioned outside said rotating body in a predetermined relationship to a plurality of photo-electric conversion elements provided within said rotating body.

7. Apparatus for measuring physical quantities of a rotating body at a plurality of measuring points thereof, said apparatus comprising
 measuring means within said rotating body for converting said physical quantities into a plurality of electrical signals;
 a plurality of gating means within said rotating body for receiving said plurality of electrical signals at respective inputs thereof, each of said gating means, when switched, applying an output signal at an output thereof;
 means outside said rotating body for applying signals to said rotating body;
 receiving means within said rotating body for receiving the applied signals;
 logic means within said rotating body for converting said applied signals received by said receiving means into logic signals;
 switching means within said rotating body for selectively switching said plurality of gating means in response to said logic signals being applied thereto; and
 means within said rotating body for receiving the output signals applied at the outputs of said gating means, whereby said output signals can be taken out of said rotating body in a desired order.

8. Apparatus as defined in claim 7, wherein said means outside said rotating body includes a plurality of light emitting elements and said receiving means within said rotating body includes a plurality of light receiving elements, said plurality of light receiving elements being exposed to the light emitted from said light emitting elements during each revolution of said rotating body.

9. Apparatus as defined in claim 7, wherein said measuring means includes a plurality of strain gages which convert mechanical strains at said plurality of measuring points of said rotating body into said plurality of electrical signals.

10. Apparatus as defined in claim 7, further including power supply means within said rotating body for supplying power to operate each of said means within said rotating body.

* * * * *